No. 694,384. Patented Mar. 4, 1902.
C. W. HUNT.
STEERING MECHANISM FOR MOTOR VEHICLES.
(Application filed May 22, 1901.)
(No Model.)

Attest:
A. N. Jesbera
Lucius E. Varney

Inventor:
Charles W. Hunt
by Redding, Kiddle & Greeley
Attys.

UNITED STATES PATENT OFFICE.

CHARLES W. HUNT, OF WEST NEW BRIGHTON, NEW YORK.

STEERING MECHANISM FOR MOTOR-VEHICLES.

SPECIFICATION forming part of Letters Patent No. 694,384, dated March 4, 1902.

Application filed May 22, 1901. Serial No. 61,376. (No model.)

*To all whom it may concern:*

Be it known that I, CHARLES W. HUNT, a citizen of the United States, residing in West New Brighton, borough of Richmond, in the city of New York, in the State of New York, have invented certain new and useful Improvements in Steering Mechanism for Motor-Vehicles, of which the following is a specification, reference being had to the accompanying drawings, forming a part hereof.

The object of this invention is to provide an improved brake or detent device for the steering-gear of motor road-vehicles whereby deflection of the steering-wheels by obstacles shall be prevented and whereby it will be unnecessary for the driver to retain his grasp upon the steering-handle except at such times as it is desired to alter the direction of movement of the vehicle.

The invention will be more fully described hereinafter with reference to the accompanying drawing, in which for purpose of illustration and explanation of the nature of the invention one convenient and practical embodiment of the invention is shown, and in which—

Figure 1:
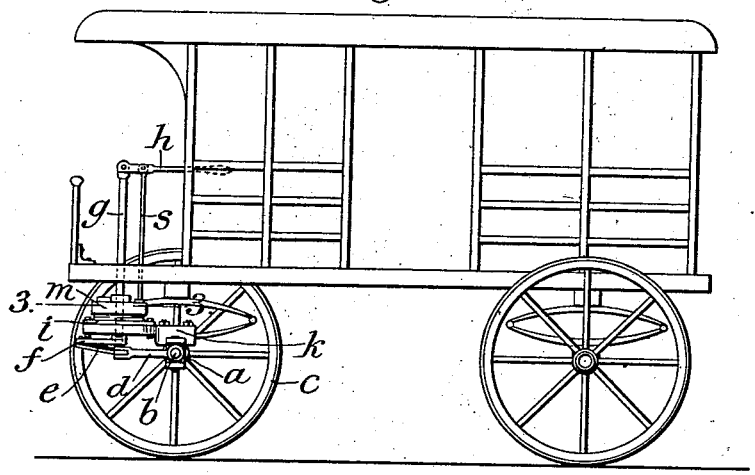
Figure 2:
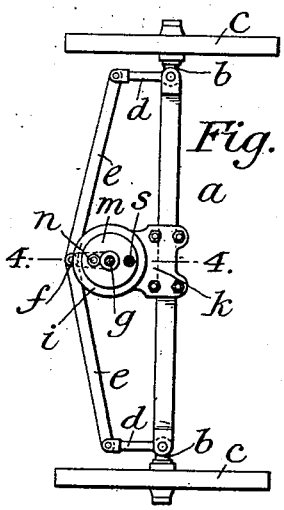
Figure 3:
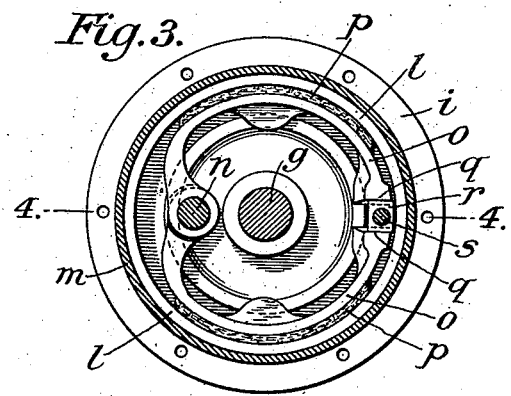
Figure 5:
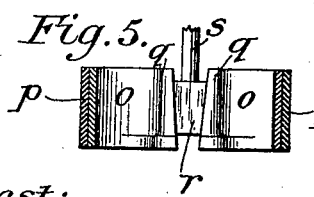
Figure 4:
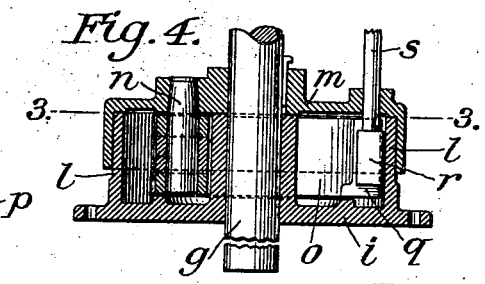

Figure 1 is a view in side elevation, partly in outline and with the near front wheel removed, of a road-wagon to which the present improvement is applied. Fig. 2 is a plan view of the front or steering axle and its wheels with the brake or detent device in position thereon, the steering-pillar and the brake or detent rod being shown in section. Fig. 3 is a detailed view of the brake or detent device in horizontal section on the plane indicated by the line 3 3 of Figs. 1 and 4, but on a larger scale than that of Fig. 1. Fig. 4 is a vertical central section on the plane indicated by the line 4 4 of Figs. 2 and 3, but on a larger scale than that of Fig. 2. Fig. 5 is a detailed view showing portions of the friction-jaws and their coöperating wedge.

The invention may be applied to any form of motor-vehicle and in connection with any desired kind of steering-gear. As shown in Figs. 1 and 2 of the drawing, the invention is illustrated as applied to a vehicle of ordinary type, having a fixed front axle $a$, upon the ends of which are pivoted the usual stub-axles $b$, bearing the independent steering-wheels $c$. The arms $d$ of the stub-axles are represented as connected by links $e$ to an arm $f$, which is rigidly secured to the usual rotary steering-pillar $g$. The latter is also represented as having pivoted upon its upper end a steering-handle $h$. All of the parts thus referred to may be of any ordinary or preferred construction and arrangement, the present invention being concerned not with the construction and arrangement of such parts, but with means for applying a brake or detent to the steering-gear for the purpose of retaining the steering-wheels in predetermined positions.

In carrying the invention into practice in the form represented in the drawing a fixed friction-plate $i$ is secured to some convenient part of the vehicle—as, for example, to a bracket $k$, which is fixed upon the axle $a$—such friction-plate being provided in the form shown with an annular wall $l$, against which bear the friction-jaws, hereinafter referred to. The friction-plate $i$ is centrally located with respect to the steering-pillar $g$, and upon the latter is secured a carrier $m$ for the friction-jaws, such carrier being preferably formed as an inverted cup the lip of which surrounds the annular wall $l$ with a close working fit, thereby excluding dust and water from the friction-surfaces. Upon a pin $n$, depending from the carrier $m$, are pivoted the friction-jaws $o$, which may be provided with a friction-surface $p$, of leather or other suitable material. The free ends of the jaws $o$, as at $q$, are suitably shaped and beveled to coöperate with a wedge $r$, which enters between the ends of such jaws and is adapted to spread the jaws, and thereby to force them into contact with the annular wall $l$. The wedge $r$ is conveniently carried by a rod $s$, which has a bearing in the carrier $m$ and is connected to the pivoted steering-handle $h$ on one side or the other of its pivot, as may be preferred.

It will now be understood that when the driver grasps the steering-handle $h$ and lifts the same slightly the wedge $r$ will be raised, relieving the pressure of the jaws $o$ against the coöperating friction-surface $l$ and leaving the steering-gear free to be moved one way or the other by the handle $h$ in the usual manner. As soon as the driver releases the steering-handle the weight of the handle and of the rod $s$ will force the wedge $r$ between the ends of the jaws $o$, and will thereby force such jaws into contact with the coöperating friction-surfaces $l$, thereby locking the steering-gear against movement in either direction.

It will be understood that although the construction and arrangement of parts shown in the drawing afford a convenient and practical embodiment of the invention, nevertheless it is not intended to limit the invention to the precise construction and arrangement shown.

I claim as my invention—

1. The combination with the stub-axles, the rotary pillar connected at its lower end to said axles and provided at its upper end with a vertically-swinging steering-handle, of a clutch mechanism comprising a fixed friction-plate through which the pillar freely passes, a second plate or carrier secured to the pillar to turn therewith, a movable jaw mounted on the carrier to engage said friction-plate, and a vertically-movable rod depending from the steering-handle and in operative relation at its lower end with the said movable jaw, substantially as described.

2. The combination with the stub-axles, the rotary pillar connected at its lower end to said axles, and provided at its upper end with a vertically-swinging steering-handle, of a clutch mechanism comprising a fixed friction-plate provided with a raised circular flange and a central aperture through which said pillar freely passes, a carrier secured to the pillar over the said flange, and having a depending stud or pin, oppositely-extending curved friction-jaws pivoted at their adjacent ends on said stud or pin, a rod depending from the steering-handle, extending through the said carrier and provided with a wedge between the free ends of said friction-jaws, to force them outwardly against the flange on the friction-plate and lock the pillar thereto; substantially as described.

3. The combination with the main axle, stub-axles at the ends thereof, a rotary steering-pillar operatively connected at its lower end to said stub-axles and provided at its upper end with a vertically-swinging handle, a bracket projecting forwardly from the main axle, a friction-plate secured thereto and having a circular raised flange on its upper side, and a central opening through which said pillar freely passes, a carrier-plate secured to said pillar and having a depending flange encircling the first-named flange, oppositely-extending curved friction-jaws pivoted to the carrier in front of the pillar and extending at their free ends in rear of the pillar, and a rod extending from the pivoted handle down through the carrier and there provided with a wedge between the free ends of the friction-jaws to force them against the circular friction-flange; substantially as described.

This specification signed and witnessed this 16th day of May, A. D. 1901.

CHARLES W. HUNT.

In presence of—
  M. C. MONTGOMERY,
  JOHN M. BLAKE.